United States Patent [19]
Holzmann

[11] Patent Number: 4,767,135
[45] Date of Patent: Aug. 30, 1988

[54] SCREW-TYPE CONDUIT FITTING

[76] Inventor: Hermann Holzmann, Salzäckerstrasse 59, D-7000 Stuttgart 80, Fed. Rep. of Germany

[21] Appl. No.: 8,317

[22] Filed: Jan. 29, 1987

[30] Foreign Application Priority Data

Feb. 11, 1986 [DE] Fed. Rep. of Germany ....... 3604214

[51] Int. Cl.⁴ ............................................ F16L 21/04
[52] U.S. Cl. ...................................... 285/27; 285/322; 285/379; 285/390
[58] Field of Search ................... 285/322, 23, 27, 390, 285/379; 403/12

[56] References Cited

U.S. PATENT DOCUMENTS

| | | | |
|---|---|---|---|
| 1,309,780 | 7/1919 | Schonfarber | 285/322 |
| 1,947,593 | 2/1934 | Hamilton | 285/379 X |
| 3,427,053 | 2/1969 | Dunlap et al. | 285/379 |
| 3,895,832 | 7/1975 | Ellis et al. | 285/343 X |
| 4,145,075 | 3/1979 | Holzmann | 285/322 X |
| 4,231,400 | 11/1980 | Friedling et al. | 285/322 X |
| 4,541,139 | 9/1985 | Jones et al. | 403/290 X |

FOREIGN PATENT DOCUMENTS

| | | |
|---|---|---|
| 1750095 | 3/1971 | Fed. Rep. of Germany . |
| 2631996 | 11/1979 | Fed. Rep. of Germany . |
| 8415525.6 | 10/1984 | Fed. Rep. of Germany . |
| 3418978 | 11/1985 | Fed. Rep. of Germany . |
| 384700 | 12/1932 | United Kingdom | 285/322 |
| 1528540 | 10/1978 | United Kingdom | 285/322 |

Primary Examiner—Thomas F. Callaghan
Attorney, Agent, or Firm—McAulay, Fields, Fisher, Goldstein & Nissen

[57] ABSTRACT

In connection with a screw-type connection made of a plastic material for leading in, leading through, sealing and strain-relieving cables, lines, or the like, comprising an intermediate connecting piece with sealing body and a cap nut, the hollow cylindrical intermediate connecting piece carrying coaxially arranged clamping tongues which press the sealing body against the fitted cable when the cap nut is turned, it is proposed that the cap nut or the intermediate connecting piece be provided with catches arranged preferably in uniform distribution over the circumference and projecting towards the other part so that a preliminary fixing effect can be achieved between the cap nut and the intermediate connecting piece by mere exertion of pressure. The catches form in this case sort of an elastic preliminary thread, and the cap nut can be screwed on further immediately from its pre-assembled position. Further, projecting retaining ribs are provided on the inner faces of the clamping tongues in the ring of clamping tongues which serve to fix the sealing body provisionally in position during insertion thereof. This feature also serves to facilitate the pre-assembly operation.

8 Claims, 1 Drawing Sheet

U.S. Patent
Aug. 30, 1988
4,767,135
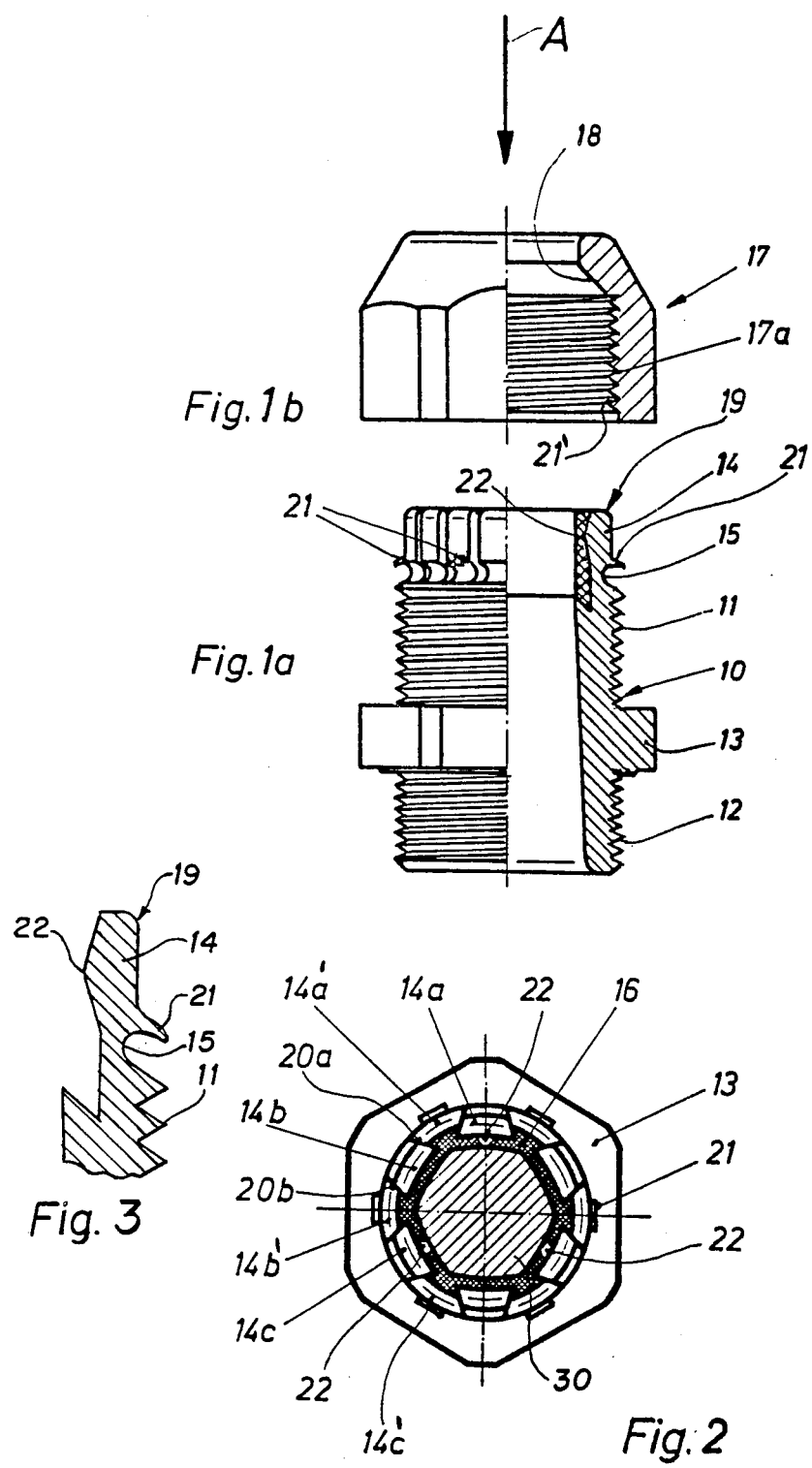

SCREW-TYPE CONDUIT FITTING

DESCRIPTION OF THE PRIOR ART

The present invention relates to a screw-type conduit fitting, i.e. a screw-type connection made from a plastic material and serving for leading in or leading through, for sealing and strain-relieving cables, lines or hoses, of the type defined by the preamble of the main claim.

A screw-type conduit fitting of this type has been known for example from German Disclosure Document No. 17 50 095 or German Patent Publication No. 26 31 996. The known screw-type conduit fittings comprise usually an intermediate connecting piece provided on both ends with external threads so that its one end can be fixed on a mounting surface or a separating wall of a cabinet, or the like, using the external thread provided thereon, while a compression nut or cap nut can be screwed upon its other end. The intermediate connecting piece is further provided with clamping tongues disposed along a circle around a concentric medium passage for the cable, or the like. The tongues may either be formed coaxially to and integrally with the intermediate connecting piece, or else be held in a separate clamping-tongue cage in which case the latter is disposed in such a manner relative to the intermediate connecting piece that the clamping tongues are urged against the fitted cable and/or an intermediate sealing body when the compression nut or cap nut is screwed on, the latter being provided with a tapering collar forming sort of an end bearing acting upon the elastic clamping tongues. In this manner, the whole assembly is finally clamped, secured against torsion, and also sealed.

It has been further known in this connection to provide the cable lead-through with a protection against torsion (German Patent Publication No. 26 31 996) acting between the cap nut on the one hand and the intermediate connecting piece on the other hand and consisting of a ratchet-like engagement between the individual clamping tongues, which are pressed together to a smaller diameter so that they overlap each other in fan-like manner, and a helical gearing provided inside the cap screw in the area of the collar.

Finally, there has been known a screw-type conduit fitting (German Disclosure Document No. 34 18 978 and German Utility Patent No. 84 15 525.6) where the ring formed by the clamping tongues arranged one beside the other comprises at least one selective clamping tongue which, due to its particular design, is urged out of the ring formed by the clamping tongues and towards the fitted cable when the cap screw acts upon the tongues so that a non-circular relationship is produced between the cable on the one hand and the clamping tongues urged inwardly towards the cable on the other hand, whereby the grip upon the fitted cable is substantially increased and a very efficient protection against torsion is obtained.

However, it is a common problem connected with all these known screw-type conduit fittings designed in this manner that the intermediate connecting piece on the one hand and the cap screw on the other hand, and normally also the sealing body which also exhibits a generally cylindrical annular shape, have to be produced as separate components so that they necessarily have to be assembled and connected for shipment. Therefore, certain additional assembly operations have to be carried out in this direction, quite apart from the problems generally encountered during shipment and storage.

Consequently, a considerable amount of manual work has to be carried out before shipment at the time when the individual finished components leave the production machine, normally as injection-molded parts.

This manual work comprises the steps of inserting the annular sealing body between the ring of clamping tongues, gripping the cap screw with one hand and the intermediate connecting piece with the other hand, moving the two parts towards each other and holding and aligning them in such a manner that the internal thread of the cap screw can be screwed, at least by a few turns, upon the external thread of the intermediate connecting piece. This latter operation requires also a certain aligning and "aiming" effort, since when matching the two threads, the latter must not be tilted relative to each other and since in addition it may be necessary to turn the two parts a little relative to each other before the threads actually engage each other, because normally one cannot expect the beginnings of the internal and the external threads to be always perfectly aligned, though on the other hand the two threads cannot possibly engage each other. During this turning movement, the two parts, namely the intermediate connecting piece and the cap screw, must remain properly aligned axially and radially until the two threads engage each other, because otherwise the threads may get tilted, and blocked.

Now, it is the object of the present invention to provide means in this area which facilitate both the preliminary assembly and the final assembly and installation of the screw-type conduit fitting by the user and which relate on the one hand to the secure mounting of the sealing body and, on the other hand, to ways for fixing the cap screw provisionally on the intermediate connecting piece in an extremely simplified manner, very rapidly and without any effort, and—under certain circumstances—even automatically.

ADVANTAGES OF THE INVENTION

The invention achieves these objectives by the characterizing features of the main claim and offers the advantage that it comprises elastic retaining means acting in the form of a preliminary thread and permitting the cap screw to be clicked or snapped upon the intermediate connecting piece simply by positioning the cap screw on the intermediate connecting piece in, basically, any inclined position which is absolutely permitted—and pressing thereafter the two parts together whereby the cap screw slides into sort of a preliminary thread position upon the intermediate connecting piece, where it is locked and fixed and simultaneously securely aligned, axially and radially, and safely protected from being detached or from coming off in any other manner.

It is a particular advantage of this arrangement that such a preliminary fixing position can be achieved with a minimum of additional cost and labor. According to a preferred embodiment of the invention, it is only necessary to provide projecting, resilient catches on the outside of selected clamping tongues in the ring of clamping tongues, at the height adjacent the thread of the intermediate connecting piece, which follows the clamping tongues downwardly, or immediately adjacent an all-round annular recess provided in the integrally formed transition between the clamping tongues and the connecting piece. These catches, which preferably are distributed evenly about the circumference, project radially approximately the same distance as the points of the following thread, which means that they extend approximately to the root diameter of the internal thread of the cap screw.

When the cap screw is screwed upon such an intermediate piece, the cap screw can be pressed upon the intermediate piece—during which operation a clear clicking noise can be heard—until the two threads abut each other, at which point the resilient catches forming the preliminary thread engage the internal thread of the cap screw already at the level of the second or third turn of the thread. Consequently, it is also possible—and this is a particularly preferred advantage of the present invention—to screw the cap screw from this intermediately fixed position further upon the connecting piece, simply by turning the screw, for the catches forming the preliminary thread are already in engagement, fix the cap screw axially and radially relative to the thread of the intermediate connecting piece, and guide the cap screw during the initial turns until the two threads actually come into engagement.

Accordingly, the user can carry out the final assembly, starting out from this pre-assembled condition of the cap nut and the intermediate connecting piece, by screwing the whole screw-type fitting by the lower threaded portion of the intermediate piece to the wall or that part of the equipment through which the cable is to be led, fitting the cable and turning the provisionally fixed cap screw further until the desired grip is achieved. In this provisionally fixed position, the fitted sealing body is also securely held by the cap screw.

It goes without saying that the catches may also be provided at the beginning of the internal thread of the cap screw, pointing towards the inside, and again preferably in uniform distribution over the whole circumference. In this case, the catches provided on the cap screw will pass the annular arrangement of the clamping tongues, maybe with a certain deflection, when the cap screw is pushed upon the intermediate connecting piece, and will then engage the outwardly concave, all-round annular groove at the transition between the ring of clamping tongues and the intermediate connecting piece. If no such annular groove is provided, then the catches provided on the cap screw will engage the first or the second turn of the external thread of the intermediate connecting piece, it being possible without any problems to design them in such a manner that they project axially beyond the thread of the cap screw.

It is a further advantage of the invention that the sealing body which consists of a cylindrical annular body made from an elastomer, can be fixed without any problems, but safely, within the ring of clamping tongues in the intermediate connecting piece, regardless of any production tolerances. This is achieved by the fact that inwardly projecting ribs, which are arranged on at least some of the clamping tongues in the ring of clamping tongues and which, preferably, are formed integrally therewith, provide a reduction of the space available for the sealing body which does not, however, reduce the diameter of the sealing body, but acts only to retain the latter safely in its position when otherwise it could be fitted only loosely between the ring of the clamping tongues.

It is not possible to overcome this problem by giving the sealing body itself a larger diameter, since in this case it would urge the clamping tongues outwardly in an unadmissible manner, its inside being in full contact with the ring of clamping tongues. It would then be difficult to mount and pre-assemble the cap screw. Due to the projecting narrow inner ribs provided on some of the clamping tongues, preferably in uniform distribution over the whole inner circumference of the ring of clamping tongues, the ribs cut only partially into the elastomeric material of the sealing body, displacing the material at these points, so that the mounting operation is not hindered in the case of close tolerances while on the other hand in the case of excessive tolerances the sealing body is still safely held by the projecting ribs.

It is an additional advantage of this arrangement that the arrangement of the catches for pre-fixing the cap nut on the one hand and the inwardly projecting ribs provided on the clamping tongues on the other hand can be produced in a common operation (injection molding) with the intermediate connecting piece, without extensive re-tooling and, as goes without saying, without any additional consumption of material. Both features serve to improve the pre-assembly of the whole screw-type conduit fitting, i.e. to provide secure fixing of the sealing body in the intermediate connecting piece and, on the other hand, to facilitate drastically the connection between the cap screw and the intermediate connecting piece by reducing this process to a simple snapping-on operation.

The features set forth in the sub-claims permit advantageous improvements and developments of the invention as specified in the main claim. Particular advantages can be derived from the combination of catches for pre-fixing the cap screw and/or of retaining ribs for the sealing body with the design of the clamping tongues which is described by German Disclosure Document No. 34 18 978 and which provides advantageously that when a pre-determined number of, for example, 12 clamping tongues are provided in uniform distribution about the circumference, half that number of tongues, in the present example 6, exhibit inclined flanks on both sides, so that when the cap nut is firmly tightened, they are pressed inwardly by the other clamping tongues, thereby forming a regular hexagon, it being understood, however, that the before-mentioned numbers are not in any way to be interpreted as limitative. The remaining clamping tongues of the ring, which will hereinafter be referred to as "stationary", are then advantageously provided on the lower ends of their outsides with the catches for locking the cap nuts, while the retaining ribs for the sealing bodies may be arranged on the insides of any type of clamping tongues.

DRAWING

One embodiment of the invention is represented in the drawing and will be explained in more detail hereafter with reference to the drawing in which:

FIGS. 1a and 1b show—by halves—lateral views of and cross-sections through the cable lead-through according to the invention, comprising the intermediate connecting piece and the cap screw arranged thereabove;

FIG. 2 shows a top view of the screw-type conduit fitting shown in FIGS 1a and 1b, the cable being removed on top in such a manner that the relative displacement between the so-called stationary clamping tongues and the selected clamping tongues protruding inwardly, as well as their action upon the fitted sealing body, can be seen; and FIG. 3 is a detailed view, in section, illustrating the catches of the present invention.

DESCRIPTION OF THE EMBODIMENTS OF THE INVENTION

It is the basic idea of the present invention to facilitate the assembly by means of a snap-in connection between the cap nut and the intermediate connecting piece that can be established by simple pressing and which provides sort of a preliminary-thread fixation and permits to pass over smoothly to the screwing operation as such when the latter is to be carried out during final assembly, and—according to a further advantageous improvement—to ensure at the same time that the sealing body is centered and fixed precisely within the inside of the ring formed by the clamping tongues.

In FIGS. 1a and 1b, the intermediate connecting piece which, preferably, is formed in this case integrally from one material, is designated by reference numeral 10, while its thread intended to receive the cap nut is designated by reference numeral 11 and its external thread intended for mounting the connecting piece on a suitable mounting surface, cabinet wall, lead-through, or the like, is designated by reference numeral 12. The intermediate connecting piece comprises usually an outer mounting collar 13 of hexagonal shape which usually rests against the mounting surface. Above this collar—as viewed in the drawing—there follow the clamping segments, teeth or clamping tongues 14—this latter expression will be used throughout the further description—the position of which can be varied by operation of the cap nut 17. As mentioned before, these clamping tongues are, preferably, formed integrally with the intermediate connecting piece 10 and provided with an outer annular groove or recess 15 at the transition between the main body of the connecting piece 10 and the tongues as such, which groove or recess serves, for example, to provide more flexibility while maintaining sufficient residual rigidity.

The area inside of the clamping tongues accommodates, over the full height of the clamping tongues, a cylindrical sealing body 16 which is held in place during the pre-assembly operations by a certain clamping effect—which will be described in detail hereafter—and which is secured in place practically undetachably for shipment when the cap nut is applied. The screw-type conduit fitting designed in this manner consists of only three elements, namely the intermediate connecting piece 10, the sealing body 16 and the cap nut 17 which is applied on the intermediate connecting piece from above and then connected with the latter by active engagement between its internal thread 17a and the external thread 11 of the intermediate connecting piece 10. The cap nut comprises further a marginal area tapering upwardly and inwardly to provide the transition to a smaller passage opening, thus forming an inclined annular surface 18 designed as an active collar. The interaction between this annular surface 18 and the upper end portions of the clamping tongues in the transition area leads to the effect, which is known as such, that the inclined surface of the end bearing thus formed urges the clamping tongues inwardly and towards each other as the cap nut 17 is screwed gradually upon the thread 11 of the intermediate connecting piece. Since this gives rise to quite considerable forces acting between the intermediate connecting piece with the clamping tongues on the one hand and the cap nut 17 on the other hand when clamping a cable, the matching threads 11 and 17 are designed in such a manner that the pressure exerted by the annular collar of the cap nut upon the clamping tongues comes to act only after the cap nut has been screwed upon the connecting piece by a few turns.

Another embodiment of the invention realized in connection with the present invention resembles in its basic structure that described by the before-mentioned German Disclosure Document No. 34 18 978. In this case, certain selective clamping tongues 14a, 14b, 14c, which are, preferably, distributed evenly about the inner circumference of the ring formed by the clamping tongues, are provided on both sides with inclined flanks 20a, 20b, tapering towards each other in outward direction, i.e. in the direction of the larger diameter, and coacting with complementary flanks of the semi stationary intermediate tongues 14a', 14b' which in the present case are provided in alternating arrangement with the flanks 20a, 20b. The pressure effects generated during the screwing operation cause the tongues to move inardly. However, because of the complimentary taper between the side edges of adjacent tongues, tongues 14a', 14b' wil force tongues 14a, 14b inwardly to a greater extent. In other words, the inward movement of the tongues will cause the said flanks 20a, 20b to move gradually inwardly along the inclined flanks of the semi stationary clamping tongues, which remain in contact with the active collar, thereby provoking a non-circular deformation of the sealing body and, finally, of the cable jacket 30. This provides quite a number of advantages which are described in closer detail by the before-mentioned disclosure document and which consist, in particular, in an improved grip due to the increase of the specific pressure, safe protection against torsion and an improved sealing effect.

Now, the invention proposes, preferably for use in connection with such an embodiment of the ring of clamping tongues, but of course also for use in connection with any other type of screw-type conduit fitting and any type of connection between its cap nut and intermediate piece, to arrange between the cap nut 17 on the one hand and the intermediate connecting piece 10 on the other hand elastic snap means which can be activated by a simple axial pressing operation and which exert a safe retaining and pre-fixing effect upon the cap nut 17 snapped in position on the intermediate connecting piece 10 until the matching threads 11 and 17a come into active engagement. In order to snap the cap nut 17 into position, the latter is in fact pressed upon the intermediate connecting piece 10 until the two matching threads abut each other, as from this point onwards any further relative axial movement between the parts towards each other can be effected only by relative rotary movement between the cap nut 17 and the intermediate connecting piece 10.

According to a first preferred embodiment of the invention, at least one clamping tongue 14 is provided, preferably at the transition between the clamping tongue and the annular groove, with a catch 21 projecting radially outwardly. In one preferred embodiment of the invention, these catches 21 are provided on all clamping tongues 14a', 14b', 14c' . . . which remain stationary when the cap screw 17 is screwed on. These catches 21 form sort of an elastic preliminary thread which easily can be overcome by pressure, which is distributed with interruptions over the whole circumference and which exhibits a radial depth corresponding substantially to the outer diameter of the points of the external thread 11 at the intermediate connection piece or to the outer diameter of the internal thread 17a of the cap nut 17. While the catches 21 may, basically, have any desired shape, it is preferred that the catch 21 commences with a thicker cross-section at its end adjacent the respective clamping tongue and tapers outwardly. The ends may downturn into a point. The angle formed at the point of the catch 21 between its two flanks may, conveniently, be equal to half the generating angle of the threads 11 or 17a. Preferably, the catches are disposed adjacent and above the annular groove 15.

The manner in which the catches operate to provide the preliminary fixing effect is easily apparent. When the cap nut 17 is pressed upon the intermediate connecting piece 10, in the direction indicated by arrow A—there is no need to take care that the cap nut is guided strictly horizontally or free from other misalignments; in fact, any inclination is permissible—a first loose centering and fixing effect is obtained by the clamping tongues 14 sliding into the opening of the cap nut, until the first turn of the internal thread 17a comes to abut the teeth or catches 21. By exerting further pressure, the cap nut 17, if tilted, is initially straightened and the catches 21 deflect a little in downward direction to give way to the inwardly projecting thread and snap thereafter audibly upon the next turn of the thread. This procedure continues until the first turn of the internal thread 17a of the cap nut engages the first turn of the external thread 11 of the intermediate connection piece 10. In this position, the catches 21 have reached approximately the third turn of the thread, although these numerical figures are without any importance and the cap nut 17 is retained with absolutely sufficient safety already after engagement of the first turn.

In this manner, the cap nut 17 is retained on the intermediate connecting piece 10 with perfect safety, in a centered position, and without any problems, it being much more difficult to remove the cap nut by exerting the pulling force required for this purpose (it is much easier, even manually, to press the cap nut down upon the intermediate connecting piece). If desired, the catches 21 may be given a configuration which facilitates their downward deflection, but makes the removal of the cap nut more difficult.

The described preliminary fixation of the cap nut on the intermediate connecting piece 10 is particularly well suited for the fully-automatic assembly of the two components, it being easily possible, in view of the state of the art in the field of automatic packaging machines or the like, to feed the intermediate connecting pieces 10 with the sealing rings for example along a first track arriving from the injection molding machine, with the clamping tongues pointing upwardly, while the cap nuts 17 are fed along a second track. At a predetermined point, the parts are then aligned, the cap nut 17 is released and pressed upon the intermediate connecting piece 10 by a ram exerting the required pressure. As mentioned before, slight misalignments and inclinations will be tolerated without any problems during this operation because downward pressure can be exerted continuously until the first turns of the respective threads abut each other.

At the assembly site, this pre-assembled screw-type conduit fitting can then be mounted and fixed in position by means of the thread 12, without removing the cap nut, whereafter the cable can be fitted and the cap nut 12 can be screwed on further, starting from its pre-assembled position, until the desired clamping, sealing and torsional action on the cable is obtained. This means that the usual operations of aligning and fitting the cap nut normally to be carried out at the assembly site, maybe even against the forces of an oblique cable, can be dispensed with.

According to an alternative embodiment of the present invention, the catches 21 provided on the lower outer faces of the clamping tongues 14 are replaced by inwardly projecting catches 21' arranged axially before the beginning of the internal thread 17a of the cap nut 18. It can be seen that in this case, too, a similar mounting procedure and preliminary fixation is achieved by these catches 21' engaging the annular groove 15 provided on the intermediate connecting piece 10. By applying some greater changes to the design, the catches 21' could of course also be permitted to engage the first turns of the external thread 11 of the connecting piece 10 when the beginning of the internal thread 17a is arranged a little further up in the cap nut 17. In this case, the positioning of the clamping tongues is merely reversed.

According to a particularly advantageous feature, rib-shaped projections 22 are provided on the inner surfaces of at least one, preferably however of a selected number of clamping tongues distributed evenly over the whole circumference, in order to provide a safe retaining effect for the elastomeric sealing body 16 which exhibits a cylindrical annular shape. The height of such ribs may correspond to the height of the clamping tongues, and their inwardly directed depth may be somewhat flatter altogether, but otherwise similar in scale to that of the catches 21. Accordingly, the ribs 22 form projections provided selectively on a small surface only, compared with the inner surface of each clamping tongue, and acting to retain and fix securely the fitted sealing body even when the latter is held in its diameter in such a manner that it is hardly in contact or in no contact at all with the clamping tongues when the latter are in their state not activated by the cap nut 17. The ribs 22, therefore, ensure that the sealing body is held safely in the rest position and that it cannot be displaced easily by the cable to be fitted, for example when the cap nut 17 is removed—while on the other hand the sealing body is also secured and clamped perfectly against torsion when the cap nut 17 is being tightened. In this case, the ribs 22 are urged into the elastomeric material of the sealing body 16 at those points where such ribs are located, but do not dig themselves notably into the fitted cable.

It is also possible to design the ribs 22 in such a manner that their height flattens gradually towards the top and towards the bottom, viewed over the height of each clamping tongue 14 with which they are formed integrally, so that the rib-like projections which act upon the sealing body by an acute or flatter point exist substantially at a point midway of the height of the clamping tongues 14 and flatten towards both ends. The shape of the ribs may be triangular.

All of the features contained in the specification, in the following claims and in the drawing may be essential to the invention, either individually or in any combination thereof.

I claim:

1. A screw-type connection for a cable and the like comprising an intermediate connector having an opening therethrough, and a plurality of circumferentially spaced clamping tongues about said opening and movable toward the center of said opening; a sealing member having a cable receiving passage therein in said opening adjacent said clamping tongues, a clamp nut having a surface adapted to engage said clamping tongues to move said tongues inwardly to press said sealing member against a cable received therethrough, said cap nut and intermediate connector having walls and complimentary formed threaded portions on said cap nut and said intermediate connector walls engageable with each other to connect together said cap nut and said intermediate member, whereby relative rotation therebetween causes said surface to engage and move said tongues, characterized in that flexible and resilient locking means extends radially from a wall of one of said cap and said connector, said locking means being positioned in advance of and immediately adjacent to said threaded portion and engageable with the threaded portion of the other of said connector and cap nut, whereby said locking means is initially deflected upon axial movement between said cap nut and said connector to permit engagement with the threads when said locking means returns to its normal position so that said nut and connector are initially connected by a pressing operation prior to said threaded connection.

2. Screw-type connection according to claim 1, characterized in that alternating ones of said clamping tongues have side edges that taper toward each other from inner to outer surface, and the remaining intermediate ones of said tongues have side edges with a complimentary taper, whereby said alternating ones of said clamping tongues are moved inwardly a greater distance than said intermediate ones of tongues due to the sliding movement between the tapered edges of adjacent tongues.

3. Screw-type connection according to claim 1, in which an annular recess is provided on said connector, characterized in that said locking means comprise catches extending outwardly from said tongues adjacent said recess, said catches terminating in a downturned pointed tip engageable in the threads of said cap nut.

4. Screw-type connection according to claim 1, in which an annular recess is provided on said connector, characterized in that said locking means comprise catches projecting inwardly from the lower end of said cap nut and are evenly circumferentially spaced about said cap nut, whereby when the cap nut is pressed upon said connector, said catches engage one out of said annular groove or the initial turns of said threaded portion of said connector to initially connect together said cap nut and said connector in a pressing operation.

5. Screw-type connection according to claim 1, characterized in that an upwardly projecting rib extending in the axial direction relative to the intermediate connector is provided on the inner surface of at least one of the clamping tongues to provide a preliminary fixing effect for the fitted sealing member.

6. Screw-type connection according to claim 3, characterized in that the catches (21) are arranged resiliently on the clamping tongues (14a', 14b', 14c'), but formed integrally therewith, and that their width is equal to approximately ⅓ to ⅔ of the width of the respective clamping tongue so that when the catches (21) are distributed evenly over the whole circumference they form an alternating preliminary thread which yields to elastic pressure and which engages the turns of the internal thread (17a) of the cap nut (17) to retain the latter when the internal thread (17a) and the external thread (11) of the cap nut (17) and the intermediate connecting piece (10) abut each other.

7. A screw-type connection for a cable and the like comprising an intermediate connector having an opening therethrough, and a plurality of circumferentially spaced clamping tongues about said opening and movable toward the center of said opening; a sealing member having a cable receiving passage therein in said opening adjacent said clamping tongues, a cap nut having a surface adapted to engage said clamping tongues to move said tongues inwardly to press said sealing member against a cable received therethrough, and complimentary formed threaded portions on said cap nut and said intermediate connector engageable with each other to connect together said cap nut and said intermediate member, whereby relative rotation therebetween causes said surface to engage and move said tongues, characterized in that flexible and resilient locking means is provided on one of said cap and said connector, said locking means being positioned in advance of said threaded portion and engageable with the threaded portion of the other of said connector and cap nut, whereby said locking means is initially deflected upon axial movement between said cap nut and said connector to permit engagement with the threads when said locking means returns to its normal position so that said nut and connector are initially connected by a pressing operation prior to said threaded connection, an upwardly projecting rib extending in the axial direction relative to the intermediate connector being provided on the inner surface of at least one of the clamping tongues to provide a preliminary fixing effect for the fitted sealing member, said inner ribs (22) serving to provide a preliminary fixing effect for the sealing member (16) which are distributed evenly over the circumference and are triangular in shape and are formed integrally with the clamping tongue on which they are arranged, and taper toward the fitted sealing member (16).

8. Screw-type connection according to claim 7, characterized in that the projecting ribs (22) for the sealing member flatten gradually at least in upward direction towards the cap nut so that the sealing member can be introduced in an unobstructed manner while the ribs dig themselves gradually into its outer face.

* * * * *